(12) United States Patent
Privette

(10) Patent No.: US 7,641,205 B2
(45) Date of Patent: Jan. 5, 2010

(54) KAYAK LOADER

(76) Inventor: Henry A. Privette, P.O. Box 885, Oriental, NC (US) 28571

( * ) Notice: Subject to any disclaimer, the term of this patent is extended or adjusted under 35 U.S.C. 154(b) by 469 days.

(21) Appl. No.: 11/508,503

(22) Filed: Aug. 23, 2006

(65) Prior Publication Data

US 2008/0048407 A1 Feb. 28, 2008

(51) Int. Cl.
B62B 1/00 (2006.01)
B62B 3/00 (2006.01)
B62B 5/00 (2006.01)

(52) U.S. Cl. .......................... 280/47.331; 280/47.131; 280/47.24; 280/47.26; 280/47.34; 280/79.3; 280/79.4; 280/79.5; 280/79.6; 280/79.7

(58) Field of Classification Search ............ 280/47.331, 280/47.131, 47.24, 47.26, 47.34, 79.3, 79.4, 280/79.5, 79.6, 79.7
See application file for complete search history.

(56) References Cited

U.S. PATENT DOCUMENTS

| 515,878 | A | | 3/1894 | Hadley et al. |
| 1,486,257 | A | | 3/1924 | Muller |
| 1,820,108 | A | * | 8/1931 | Agramonte ............ 280/124.17 |
| 3,412,702 | A | | 11/1968 | Mann |
| 4,018,179 | A | | 4/1977 | Rutter |
| 4,072,119 | A | | 2/1978 | Williams |
| 4,732,102 | A | | 3/1988 | Holman et al. |
| 4,861,057 | A | * | 8/1989 | Kunkle ................... 280/47.131 |
| 5,002,000 | A | | 3/1991 | Rutter |
| 5,116,068 | A | * | 5/1992 | Declouette ............... 280/47.24 |
| 5,131,342 | A | | 7/1992 | Sackett |
| 5,860,379 | A | | 1/1999 | Moody |
| 6,032,601 | A | | 3/2000 | Gates |
| 6,131,528 | A | | 10/2000 | Meek et al. |
| 6,260,864 | B1 | * | 7/2001 | Smith ....................... 280/47.26 |
| 6,477,968 | B2 | | 11/2002 | Powell |
| 7,431,314 | B2 | * | 10/2008 | Donaldson ............... 280/47.27 |
| 2006/0138738 | A1 | * | 6/2006 | McKenna .............. 280/47.131 |

* cited by examiner

*Primary Examiner*—Paul N Dickson
*Assistant Examiner*—John R Olszewski
(74) *Attorney, Agent, or Firm*—MacCord Mason PLLC

(57) ABSTRACT

A cart is described for use in transporting and loading kayaks and similar watercraft. The cart includes first and second side frame members having forward and rear ends; a support member extending between the frame members adjacent the frame member rear ends; a bracing member extending between the frame members adjacent the frame member forward ends; a wheel assembly adjacent the rear ends of the frame members, the assembly including first and second axle ends and wheels carried on the axle ends; and an anti-reverse braking means preventing rearward movement of the cart upon tilting of the cart upward. The braking means may include a first component attached to a frame member and a second component attached to a rotatable component of the wheel assembly, the first and second components being moved into locking engagement upon upward tilting of the cart.

11 Claims, 2 Drawing Sheets

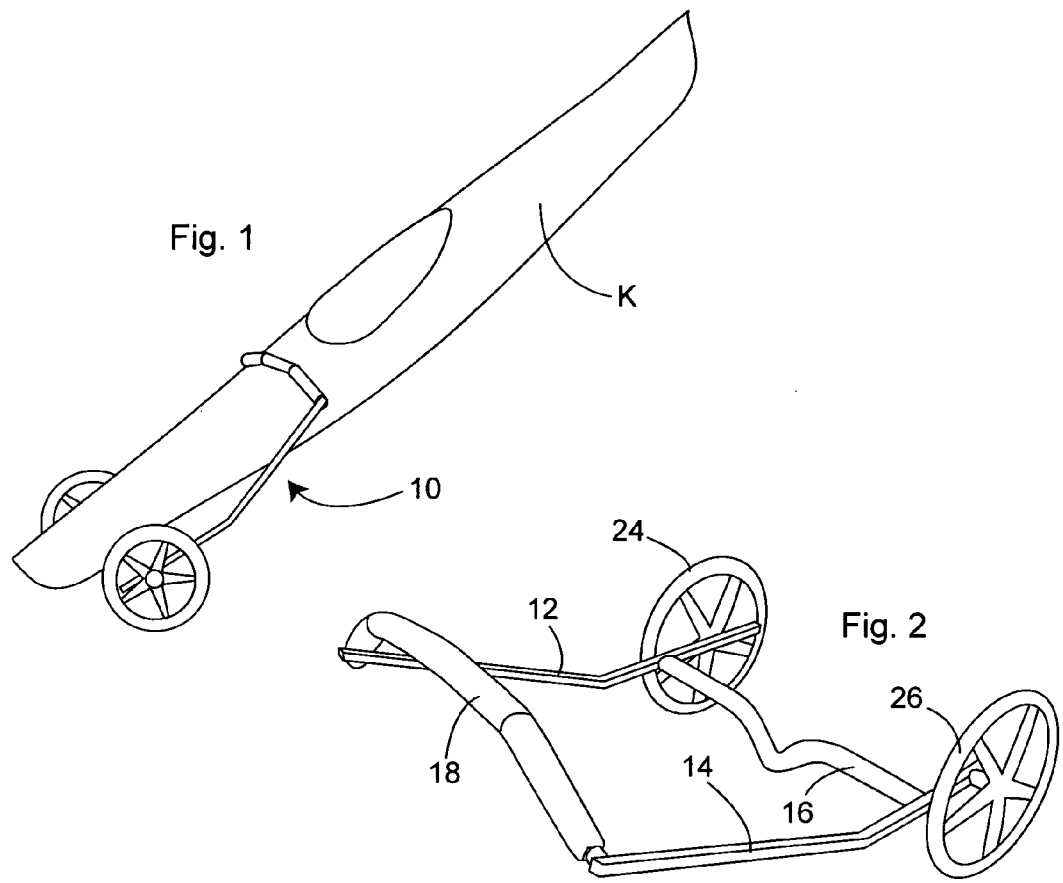
Fig. 1
Fig. 2
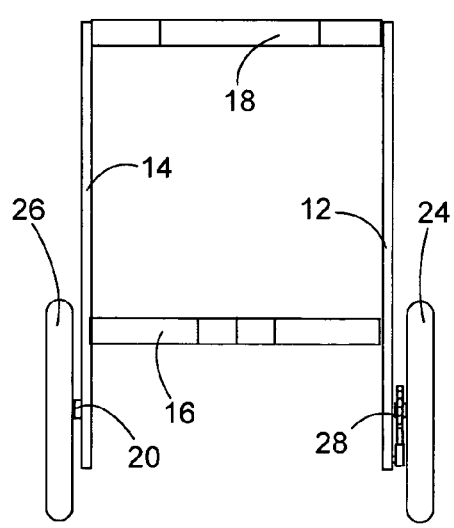
Fig. 3

KAYAK LOADER

BACKGROUND OF THE INVENTION (1) Field of the Invention

The present invention relates generally to a cart for transporting and loading kayaks, and in particular to a cart that will not roll backward when tilted to load a kayak onto the roof of a vehicle or into a pickup truck bed.

(2) Description of the Prior Art

Kayaks are graceful and easy to manipulate when in the water. Circumstances change dramatically when the kayak must be moved on land or loaded onto a vehicle for transport. Movement of a kayak is particularly cumbersome when loading is attempted by a single individual. An apparatus to assist in the transportation of a kayak between two places, such as a vehicle and a body of water that would also minimize the difficulty of loading the kayak onto a vehicle would be of considerable value to individuals who are required to handle a kayak without assistance from others.

SUMMARY OF THE INVENTION

The present invention relates to a kayak cart that substantially minimizes the difficulty in transporting and loading a kayak. While the cart will be described with reference to its use with a kayak, it will be understood that the cart is also useful in transporting and loading canoes and other watercraft, and that the term "kayak" should be read to include similar watercraft.

Basically, the cart is comprised of a kayak carriage with generally parallel side frame members having forward and rear ends, a support bar extending between the frame members adjacent the frame member rear ends, a bracing bar extending between the frame members adjacent the frame member forward ends, a wheel assembly including axles ends and wheels carried on the axle ends, and an anti-reverse braking mechanism preventing rearward movement of the cart.

The frame members are preferably constructed of tubular aluminum, steel or other suitable metal, but may also be constructed of engineering plastic or the like. Each frame member may include a rear section having a first longitudinal axis and a forward section having a second longitudinal axis extending upwardly at an angle from the front end of the rear section, e.g., at an angle of from about 5° to about 30°.

The support bar is used to support the kayak and is of a length at least equal to the width of the kayak to be transported so that the kayak will not contact the wheels on the outer sides of the frame members. Preferably, the support bar is transverse to the frame members and the support bar ends are attached to the frame members slightly forward of the locations where the axles are mounted so that the weight of the kayak causes the frame members to pivot about the axles, urging the forward ends of the frame members downwardly.

The support bar, which may be constructed of the same material as the frame members, preferably includes a downwardly extending central section to receive the kayak keel and/or stern. The shape of the central section will generally conform to the keel profile. For example, the central section may have a V-shape. The support bar is preferably padded, e.g., with a foam material to avoid damage to the kayak finish.

The bracing bar serves to apply pressure to the upper surface of the kayak when the kayak is mounted on the cart, thereby holding the kayak securely onto the cart. Generally, the bracing bar extends transverse to the frame members with the ends of the bracing bar being secured, e.g., welded, adjacent the forward ends of the frame members. The bracing bar may be constructed of the same material as the frame members. If desired, a detachable retainer, such as a strap or other semi-rigid component, may be used to pass around the kayak in the loader to prevent lateral (side-to-side) movement of the kayak.

The bracing bar is preferably curved upwardly between its ends to generally conform to the upper surface of the kayak adjacent the cockpit area. For example, the bracing bar may be comprised of a horizontal center section and downwardly angled outer sections. The bracing bar is preferably covered with a cushioning material, e.g., foam tubing material, to prevent damage to the kayak surface.

The cart is rolled on a wheel assembly comprised of a pair of spaced, parallel wheels, preferably rubber-tired or pneumatic-tired wheels that are mounted on axle ends, i.e., the segments of axles where wheels are mounted, extending in opposite directions outwardly from adjacent the rear ends of the frame members. The axle ends lie along a common longitudinal axis and may be the opposed outer ends of a single axle or the outer ends of two separate shorter axles. Preferably, at least one axle end is rotatable with the wheel mounted thereon being fixedly attached to the axle end.

Loading of a kayak onto the top of a vehicle or into the bed of a pickup truck by a single individual can be challenging due to the length and/or weight of the kayak. The present cart greatly increases the ease of loading a kayak by including an anti-reverse braking mechanism that is engaged to prevent the cart from rolling backward when the front end of the kayak is raised for loading, tilting the kayak and cart upwardly. Thus, the user can simply pull the kayak to the desired position and raise the front end of the kayak for loading without the kayak rolling backwards and out of position. The wheel assembly and anti-reverse braking mechanism can be sold as part of the cart, or the wheel assembly and/or the anti-reverse braking mechanism can be sold separately to retro-fit an existing cart.

In a preferred embodiment of the invention, the anti-reverse braking mechanism is comprised of a ratchet wheel that is affixed to a rotatable axle end, and a pawl that is pivotally attached to the outer side of the frame member in front of the axle ends. Other anti-reverse braking mechanisms will become apparent to one skilled in the art after reading the present description.

Preferably, the anti-reverse braking mechanism is designed so that the pawl automatically engages the ratchet when the front end of the cart is tilted upward, as when loading the kayak onto a vehicle. Automatic locking ensures that the cart will not roll backward during loading due to the user's failure to lock the mechanism, possibly causing damage to the kayak, the vehicle or a person.

For example, the pawl may be pivotally attached to the frame in front of the ratchet at a distance whereby the pawl hangs in front of and out of engagement with the ratchet when the cart is substantially horizontal, and pivots into engagement with the ratchet when the cart is tilted upward, e.g., at least about 30° from horizontal. The pawl may include means, e.g., a spring, clip, or other damping mechanism, to prevent flipping of the pawl against the ratchet when the cart strikes a bump or pothole, or is otherwise shifted rapidly. Even if the pawl were to accidentally engage, the forward movement of the cart/kayak would not be impaired.

In use, the rear of the kayak is positioned onto the support bar with the bracing bar being generally over the top of the kayak behind the cockpit. Generally, the weight of the kayak on the support pushes the bracing bar downwardly onto the kayak to secure the kayak in place without the need for straps or other lashing members. However, straps or other retainer means may be used, if desired. The user can then move the kayak by simply lifting the front of the kayak and pulling it to the desired location. When the kayak is to be loaded onto a vehicle, the user raises the front of the kayak to the desired predetermined height, tilting the kayak and the cart. The locking mechanism may be adjusted to engage at a selected angle of tilt. Rearward movement of the kayak is prevented by the anti-reverse braking mechanism, thus holding the kayak and cart in a static position. The user can then move to the back or stern of the craft and lift and slide it onto the vehicle, or car top carrier.

BRIEF DESCRIPTION OF THE DRAWINGS

FIG. 1 is a perspective view of a kayak mounted on a cart and tilted for loading onto a vehicle.

FIG. 2 is a perspective view of a preferred cart.

FIG. 3 is a top view of a preferred cart.

DETAILED DESCRIPTION OF THE INVENTION

Figure 4:
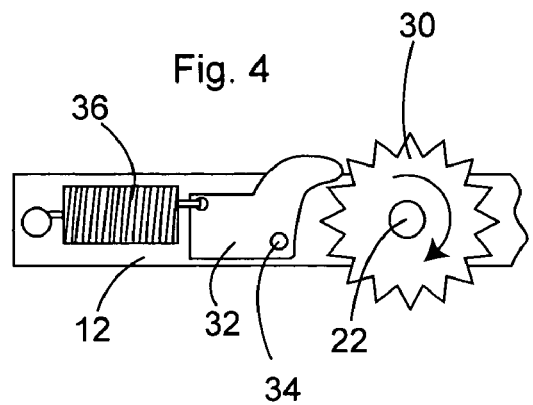
FIG. 4 is a detailed side view of the anti-reverse mechanism.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As illustrated in FIGS. 1-3, cart, generally 10, is comprised of side frame members 12 and 14, padded support bar 16, padded bracing bar 18, axles 20 and 22 supporting wheels 24 and 26, respectively, and anti-reverse mechanism 28.

As illustrated in detail in FIG. 4, anti-reverse mechanism 28 is comprised of ratchet wheel 30 affixed to axle 22 and rotatable therewith, and a pawl 32 pivotally mounted onto frame member 12 by pin 34 to engage the teeth of ratchet wheel 30. Spring 36 mounted between pawl 32 and frame 12 urges pawl 32 to its forward position.

In use, as illustrated in FIG. 1, the rear section of kayak (K) is positioned onto support bar 16 with bracing bar 18 being urged downwardly against the top of kayak K by the weight of the kayak. When loading the kayak onto a vehicle, the user raises the front of the kayak to the desired height, tilting the kayak and the cart. Rearward movement of the kayak is prevented by the anti-reverse braking mechanism 28. Specifically, cart 10 can be rolled forward with pawl 32 riding on the tops of the teeth of ratchet wheel 30. However, when cart 10 is urged rearwardly, pawl 32 engages the rear surface of one of the teeth preventing ratchet wheel 30 and attached axle 22 from rearward rotation. Therefore, the user is able to tilt the kayak without the danger of rearward movement.

Figure 5:
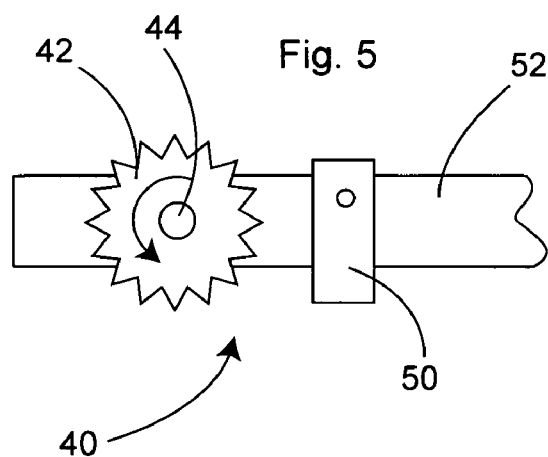
FIG. 5 is a detailed side view as seen from the wheel side of an alternative anti-reverse mechanism in which the pawl is separated from the ratchet when the cart is horizontal.
Figure 6:
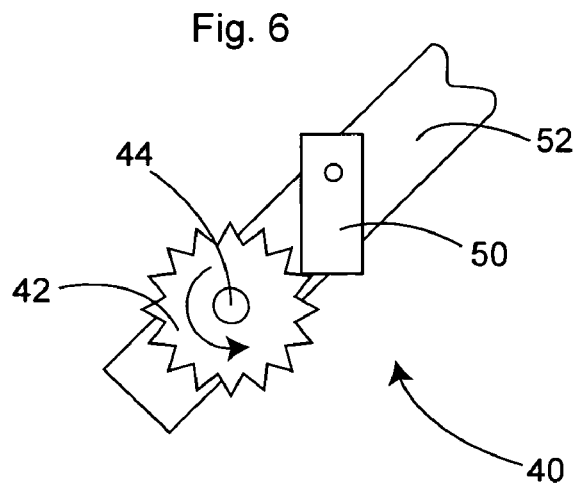
FIG. 6 is a detailed side view of the mechanism illustrated in FIG. 5, but with the cart tilted upward to show locking engagement of the pawl with the ratchet to prevent the cart from rolling backwards.

FIGS. 5 and 6 illustrate an alternative anti-reverse braking mechanism, generally 40, designed to engage when the cart is tilted upward, thereby preventing backward movement of the cart, e.g., during loading of a kayak onto a vehicle. Mechanism 40 is comprised of ratchet 42 rotatable with axle 44, and pawl 50 pivotally attached at its upper end to frame 52 in front of axle 44.

As shown in FIG. 5, pawl 50 hangs forward of ratchet 42 when frame 52 is substantially horizontal. However, as illustrated in FIG. 6, pawl 50 pivots relative to frame 52 to remain in a vertical orientation as frame 52 is tilted upward, moving pawl 50 into locking engagement with ratchet 42. As a result, the cart is prevented from rearward movement by engagement of pawl 50 with the teeth of ratchet 42. However, the cart can still be rolled backward when not tilted.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A cart for transporting and loading kayaks comprising:
   a) first and second side frame members having forward and rear ends;
   b) a support member extending between the frame members adjacent the frame member rear ends;
   c) a bracing member extending between the frame members adjacent the frame member forward ends;
   d) a wheel assembly adjacent the rear ends of said frame members, said assembly including first and second axle ends with at least one of said ends being a rotatable axle end, and wheels carried on said axle ends; and
   e) an anti-reverse braking means including a pawl attached to a frame member and a ratchet attached to said rotatable axle end, said pawl engaging said ratchet upon upward tilting of said cart.

2. The cart of claim 1, wherein said first and second side frame members are parallel.

3. The cart of claim 1, wherein said axles are between said support member and the rear ends of said frame members.

4. The cart of claim 1, wherein said support member is transverse to said frame members.

5. The cart of claim 1, wherein said support member includes a downwardly extending central section.

6. The cart of claim 1, wherein said bracing member is upwardly curved.

7. The cart of claim 1, wherein said support and bracing members are padded.

8. The cart of claim 1, wherein each of said frame members includes a rear frame section with a rear end, a front end and a longitudinal axis, and a forward frame section with a rear end, a front end and a longitudinal axis, said forward frame section extending upwardly from the front end of said rear frame sexton at an angle of from about 5° to about 30°.

9. A cart for transporting and loading kayaks comprising:
   a) first and second side frame members having forward and rear ends;
   b) a support member extending between the frame members adjacent the frame member rear ends;
   c) a bracing member extending between the frame members adjacent the frame member forward ends;
   d) first and second axle ends projecting outward from adjacent the frame members rear ends, one of said axle ends being rotatable;
   e) first and second wheels mounted on said axles; and
   f) anti-reverse braking means including a ratchet affixed to said rotatable axle end and a pawl mounted on a frame member, said pawl and ratchet being engaged upon upward tilting of said cart.

10. The cart of claim 9, wherein each of said frame members includes a rear frame section with a rear end, a front end and a longitudinal axis, and a forward frame section with a rear end, a front end and a longitudinal axis, said forward frame section extending upwardly from the front end of said rear frame section at an angle of from about 5° to about 30°.

11. The cart of claim 9, wherein said pawl is rotatable attached to one of said frame members, said pawl being rotatable into locking engagement with said ratchet upon tilting said cart upwardly to a predetermined angle above horizontal.

* * * * *